(12) United States Patent
Kawamura et al.

(10) Patent No.: US 7,246,848 B2
(45) Date of Patent: Jul. 24, 2007

(54) SUNROOF APPARATUS

(75) Inventors: Kazusige Kawamura, Kariya (JP);
Makoto Muranaka, Kariya (JP);
Naoaki Hoshihara, Kariya (JP)

(73) Assignee: Aisin Seiki Kabushiki Kaisha, Kariya, Aichi-ken (JP)

( * ) Notice: Subject to any disclaimer, the term of this patent is extended or adjusted under 35 U.S.C. 154(b) by 0 days.

(21) Appl. No.: 11/449,830

(22) Filed: Jun. 9, 2006

(65) Prior Publication Data

US 2006/0279111 A1 Dec. 14, 2006

(30) Foreign Application Priority Data

Jun. 9, 2005 (JP) .............................. 2005-169861

(51) Int. Cl.
*B60J 7/05* (2006.01)
(52) U.S. Cl. .................. 296/213; 296/216.08; 296/223
(58) Field of Classification Search .......... 296/216.08, 296/223, 213, 214
See application file for complete search history.

(56) References Cited

U.S. PATENT DOCUMENTS

| | | | |
|---|---|---|---|
| 4,664,439 A * | 5/1987 | Schaetzler et al. .......... 296/213 |
| 4,828,318 A * | 5/1989 | Reintges et al. ............ 296/213 |
| 4,883,311 A * | 11/1989 | Kohlpaintner et al. ...... 296/213 |
| 5,114,208 A * | 5/1992 | Ikeda et al. ............ 296/216.04 |
| 6,186,585 B1 * | 2/2001 | Okada et al. ................ 296/214 |

FOREIGN PATENT DOCUMENTS

| | | |
|---|---|---|
| JP | 1-122318 | 8/1989 |
| JP | 2001-163059 | 6/2001 |

* cited by examiner

*Primary Examiner*—Dennis H. Pedder
(74) *Attorney, Agent, or Firm*—Finnegan, Henderson, Farabow, Garrett & Dunner L.L.P.

(57) ABSTRACT

A sunroof apparatus includes: a first internal wall surface with which a guide rail is provided; a second internal wall surface with which the guide rail is provided and which faces the first internal wall surface in a height direction; a main body portion which the sliding member includes and which is supported by the first internal wall surface; and a first flexible portion which the sliding member includes. One end of the first flexible portion is connected to the main body portion, while the other end of the first flexible portion is configured to come in pressure-contact with the main body portion when the first flexible portion comes in pressure-contact with the second internal wall surface.

9 Claims, 3 Drawing Sheets

Frontward ← → Rearward

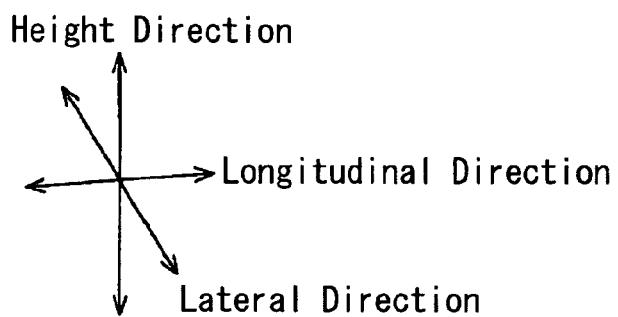
FIG. 3
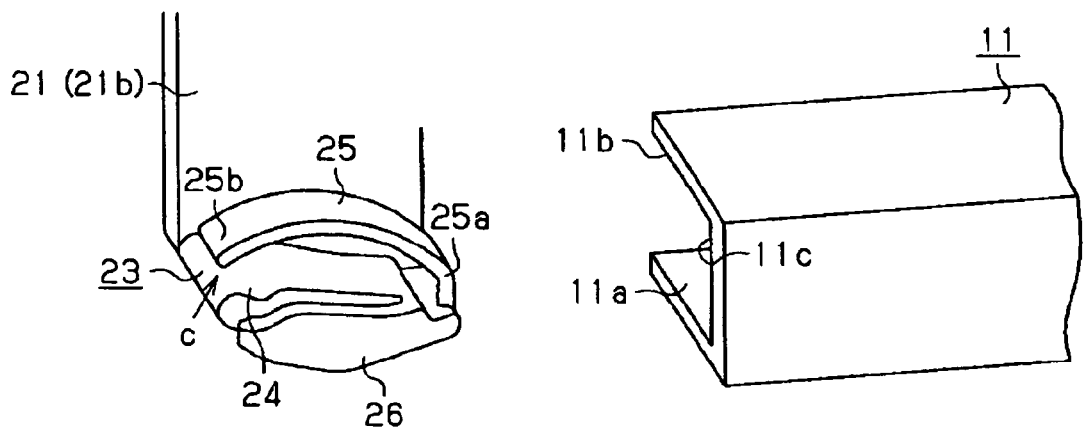
FIG. 4
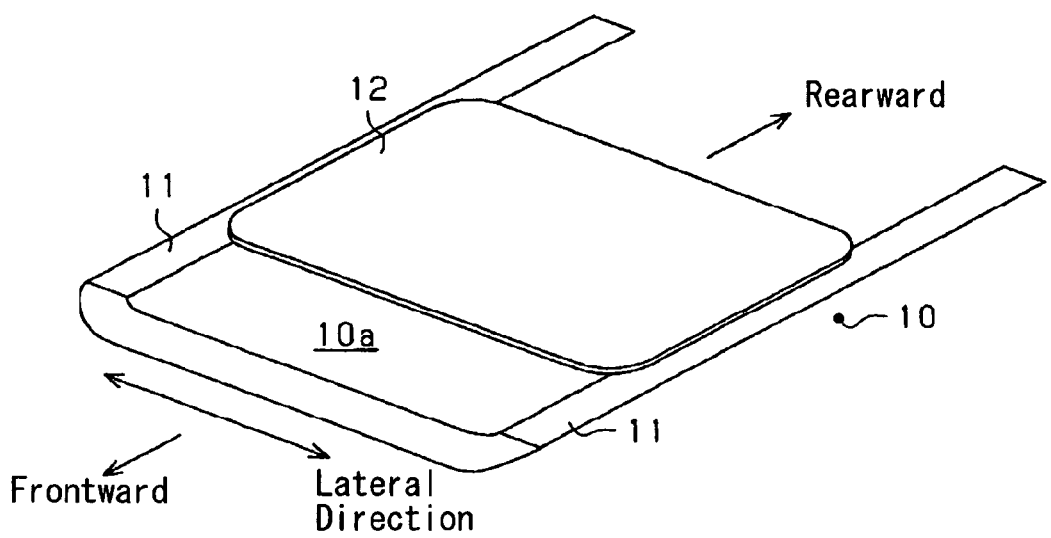

SUNROOF APPARATUS

CROSS REFERENCE TO RELATED APPLICATIONS

This application is based on and claims priority under 35 U.S.C. §119 with respect to Japanese Patent Application 2005-169861, filed on Jun. 9, 2005, the entire content of which is incorporated herein by reference.

FIELD OF THE INVENTION

This invention generally relates to a sunroof apparatus, which can be mounted on a vehicle.

BACKGROUND

Various types of sunroof apparatuses, which open and close an opening portion formed at a roof of a vehicle by a sliding panel, have been conventionally suggested, for example as disclosed in Japanese Patent Publication 2001-163059 (FIGS. 1-10) and in Japanese Utility Model Publication 1(1989)-122318 (FIGS. 1-12). The panel associated with this type of sunroof apparatus is provided with sliding members freely slidably supported by a pair of guide rails that are arranged at both lateral sides of the opening portion of the roof. The opening portion of the roof is opened and closed in response to slidable movements of the sliding members of the panel along the guide rails.

In the sunroof apparatus disclosed in the aforementioned Japanese Patent Publication 2001-163059, each sliding member is in pressure-contact with the guide rail at a time of sliding thereon and includes a pair of flexible portions supported substantially in a cantilevered structure relative to a main body. This type of structure may result in a less elastic reaction force of each flexible portion. In such circumstances, for example when a vehicle vibration is created, there is a problem that the flexible portions cannot act sufficiently to support the panel, which may cause occurrences of looseness or abnormal noises. Moreover, such less elastic reaction forces of the flexible portions may lead to reduced endurance lives.

On the other hand, in the sunroof apparatus disclosed in the aforementioned Japanese Utility Model Publication 1(1989)-122318, each sliding member, which comes in pressure-contact with the guide rail at a time of sliding thereon, includes a flexible portion which is supported in a doubly supported structure. This type of structure may result in an increased elastic reaction force of the flexible portion. In such circumstances, such increased elastic reaction force of the flexible portion may lead to a deterioration of an assembling performance of the sliding member to the guide rail. Moreover, there is a problem that a vehicle vibration applied to the sliding member may overreach a durability of the sliding member or the flexible portion and that the flexible portion may broken at its fixed ends, i.e., at its portions where the flexible portion is connected to the frame body.

The present invention has been made in view of the above circumstances, and provides a sunroof apparatus which can restrain occurrences of looseness or abnormal noises due to a vehicle vibration and can assure a good assembling performance.

SUMMARY OF THE INVENTION

According to an aspect of the present invention, a sunroof apparatus for a vehicle includes: a roof portion of the vehicle; a panel for opening and closing an opening portion defined at the roof portion; a guide rail configured to move the panel for opening and closing the opening portion; a sliding member, one end of which is freely rotatably connected to the panel, and an other end of which is freely slidably supported by the guide rail, wherein the sliding member is configured to slidably move and incline at the guide rail in association with an inclination of the panel, and the sliding member is configured to slidably move at the guide rail in association with the movement of the panel. The sunroof apparatus further includes: a first internal wall surface with which the guide rail is provided; a second internal wall surface with which the guide rail is provided and which faces the first internal wall surface in a height direction; a main body portion which the sliding member includes and which is supported by the first internal wall surface; and a first flexible portion which the sliding member includes. One end of the first flexible portion is connected to the main body portion, while the other end of the first flexible portion is configured to come in pressure-contact with the main body portion when the first flexible portion comes in pressure-contact with the second internal wall surface.

BRIEF DESCRIPTION OF THE DRAWINGS

The foregoing and additional features and characteristics of the present invention will become more apparent from the following detailed description considered with reference to the accompanying drawings, wherein:

FIG. 3 is an exploded perspective view illustrating a relevant portion of a sunroof apparatus according to an embodiment of the present invention; and FIG. 4 is a perspective view schematically illustrating the sunroof apparatus and a roof portion of a vehicle such as an automobile.

DETAILED DESCRIPTION

An embodiment of the present invention is described herein with reference to FIGS. 1, 2, 3 and 4.

As can be seen from FIG. 4, a roof portion 10, which can be applied to a vehicle such as an automobile, is formed with an opening portion 10a. A pair of guide rails 11, which extend in a longitudinal direction of the vehicle, are arranged at laterally outer edges of the opening portion 10a. A panel 12 is supported by these guide rails 11 so as to freely slidably move longitudinally along the guide rails 11 in a manner described later, and the opening portion 10a is opened and closed in response to a longitudinal movement of this panel 12.

Figure 1A:
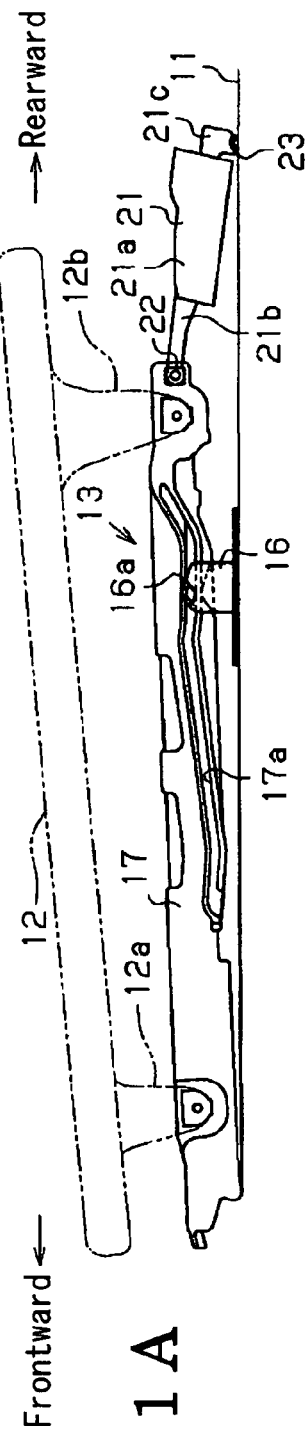
FIG. 1A is a side view illustrating a roof panel at a fully closed state as seen from an outside according to an embodiment of the present invention.
Figure 1B:
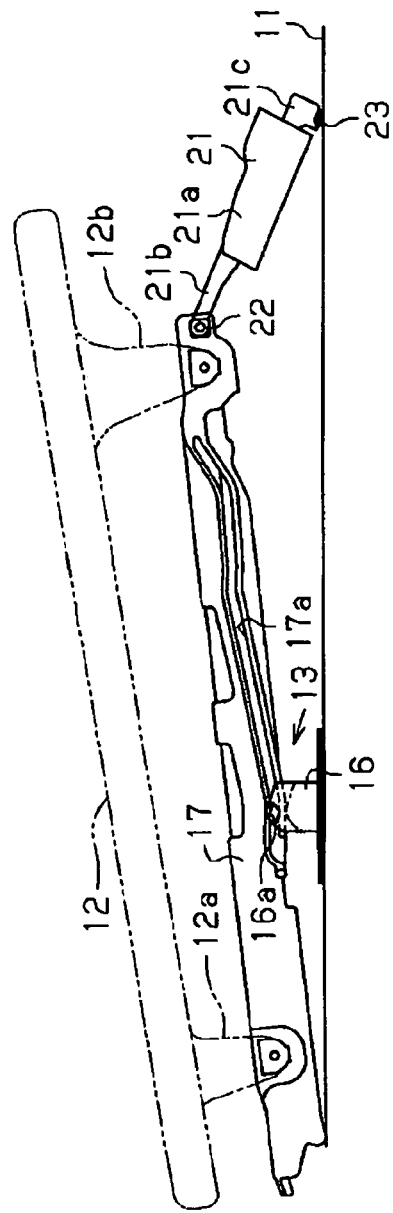
FIG. 1B is a side view illustrating the roof panel at a tilted-up state as seen from the outside.
Figure 1C:
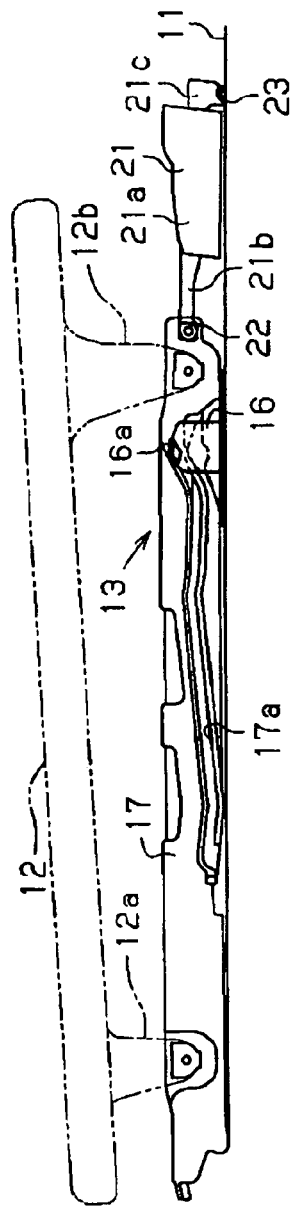
FIG. 1C is a side view illustrating the roof panel at a titled-down state as seen from the outside.
Figure 2A:
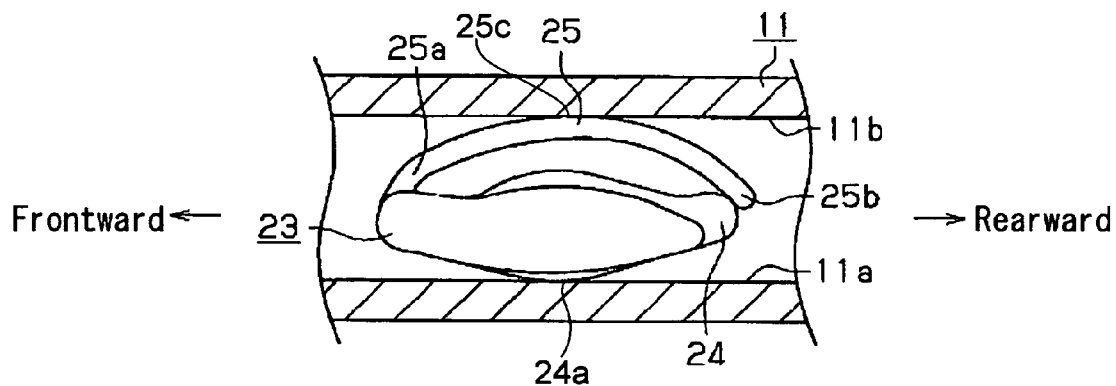
FIG. 2A is an enlarged view illustrating the roof panel illustrated in FIG. 1A.
Figure 2B:
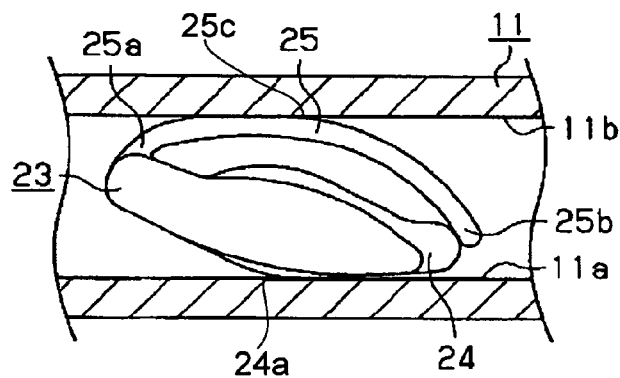
FIG. 2B is an enlarged view illustrating the roof panel illustrated in FIG. 1B.
Figure 2C:
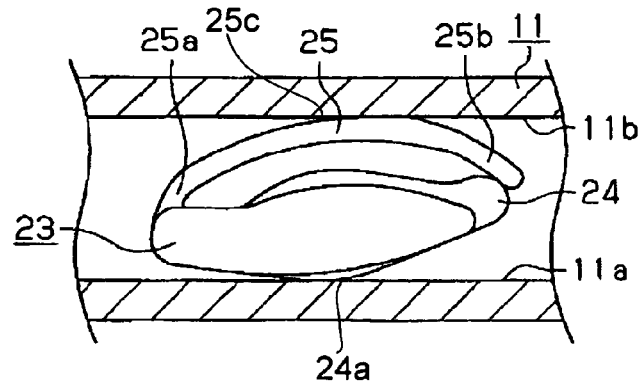
FIG. 2C is an enlarged view illustrating the roof panel illustrated in FIG. 1C.

Next, described below is a structure associated with a movement of the panel 12 with reference to FIGS. 1 and 2. FIGS. 1A and 2A show the panel 12 at the fully closed state. FIGS. 1B and 2B show the panel 12 at the tilted-up state with its rear end being lifted up. FIGS. 1C and 2C show the panel 12 at the tilted-down state with its rear end being lifted down. When the panel 12 is at the tilted-down state, a projecting amount of the panel 12 in a vehicle height direction (in an upward direction in FIG. 1C) is controlled to be less overall, the panel 12 can be moved into and stored at a space defined between the roof portion 10 and a ceiling portion. In other words, according to the embodiment of the present invention, the panel 12 is a so-called inner sliding type according to which a panel slidably moves towards a vehicle inner side of a ceiling during a panel tilted-down state.

As is illustrated in FIGS. 1A, 1B and 1C, an opening and closing mechanism 13 is provided between the guide rail 11 and a laterally outer edge portion of the panel 12. FIGS. 1A, 1B and 1C illustrate the opening and closing mechanism 13 at the left side as viewed from a rear of the vehicle. However, an opening and closing mechanism 13, which has the same general construction as the left one, can be provided at the right side. It is to be understood that the description below can be applied not only to the left-side opening and closing mechanism 13 but also to the right-side opening and closing mechanism 13. The opening and closing mechanism 13 illustrated in FIG. 1 includes a slide shoe 16 freely slidably supported by the guide rail 11; and a bracket 17 equipped to the panel 12 via attachments 12a and 12b.

The slide shoe 16 is operated by an actuator (not illustrated) and is slidably moved longitudinally along the guide rail 11. This slide shoe 16 is attached with a guide pin 16a projecting inwardly and outwardly along the vehicle lateral direction. The bracket 17 is formed with a guide gutter 17a recessed inwardly and outwardly along the vehicle lateral direction in response to the guide pin 16a. This guide gutter 17a is formed so as to decline towards the front from the rear of the vehicle. The guide pin 16a is inserted into the guide gutter 17a so as to be allowed to move longitudinally. As illustrated in FIG. 1A, when the panel 12 is at the fully closed state, the slide shoe 16 (the guide pin 16a) is positioned at a longitudinally intermediate portion of the guide gutter 17a.

According to the embodiment of the present invention, in a condition where the panel 12 is at the fully closed state, when the slide shoe 16 is operated to slide on the guide rail 11 towards the front, a rear end of the bracket 17 is lifted up via the guide gutter 17a into which the guide pin 16a is inserted, and so the panel 12 is inclined with its rear end being lifted up (a tilted-up state), as is obvious from FIG. 1B. On the other hand, in a condition where the panel 12 is at the fully closed state, when the slide shoe 16 is operated to slide on the guide rail 11 towards the rear of the vehicle, the rear end of the bracket 17 is lifted down via the guide gutter 17a into which the guide pin 16a is inserted, and so the panel 12 is inclined with its rear end being lifted down (a tilted-down state), as is obvious from FIG. 1C.

According to the embodiment of the present invention, a rain channel 21 serving as a sliding member is provided below a rear end of the panel 12. This rain channel 21 is made of, for example a resin material, and includes: a channel portion 21a extending laterally along the rear end of the panel 12; an end portion 21b extending from the channel portion 21a towards the bracket 17; and the other end portion 21c extending from the channel portion 21a towards an opposite side to the bracket 17 along the guide rail 11. The channel portion 21a, the end portion 21b and the other end portion 21c act as a unit. It is obvious that the end portion 21b and the other end portion 21c are also provided at the right side of the panel 12 in the same manner as the left side thereof.

The channel portion 21a is employed so as to drain a foreign obstacle such as water outside, the foreign obstacle which invades through a roof face mating the rear end of the panel 12. The end portion 21b is freely rotatably connected to the bracket 17 via a shaft 22. That is, the rain channel 21 is freely rotatably connected to the panel 12 via the bracket 17 and the shaft 22. The other end portion 21c is freely slidably supported at the guide rail 11 via a sliding portion 23 of the rain channel 21.

More particularly, as is apparent from FIG. 3, the guide rail 11 exhibits an approximately reverse C-shaped cross section with a first internal surface 11a; a second internal surface 11b; and a third internal surface 11c which connects the first internal surface 11a to the second internal surface 11b in a vehicle height (vertical) direction. The first internal surface 11a and the second internal surface 11b are respectively arranged at downside and upside of the guide rail 11.

On the other hand, the sliding portion 23 includes a main body 24 supported by the first internal surface 11a of the guide rail 11; a first flexible portion 25; and a second flexible portion 26. The main body 24, the first flexible portion 25 and the second flexible portion 26 are integrally molded. As illustrated in FIGS. 2A to 2C, the main body 24 is formed in an approximately triangular shape in which a longitudinally intermediate portion 24a of the main body 24 projects downwardly. This main body 24 is supported by the first internal surface 11a in such a manner that the main body 24 exhibits a longitudinally approximately symmetric posture when the panel 12 is at the fully closed state (see FIG. 2A).

The first flexible portion 25 is formed or molded so as to extend in an arched shape in the vehicle longitudinal direction with a longitudinally intermediate portion 25c projecting upwardly. One end 25a of the first flexible portion 25 is fixed to the main body 24, and the other end 25b is in contact with the main body 24 while the first flexible portion 25 is being in pressure-contact with the second internal surface 11b. The one end 25a and the other end 25b, especially contact points thereof with the main body 24, are aligned in the vehicle longitudinal direction. That is, in the state where the sliding portion 23 (the rain channel 21) has been mounted on the guide rail 11, the first flexible portion 25 is supported in a doubly supported structure by the one end 25a and the other end 25b as fixed ends. Therefore, an elastic reaction force of the first flexible portion 25 at this point can be increased or reinforced in response to this doubly supported structure.

Meanwhile, as is illustrated in FIG. 3, when the sliding portion 23 (the rain channel 21) has not been assembled to the guide rail 11, there is a clearance C being defined between the other end 25b of the first flexible portion 25 and the main body 24. That is, in this situation, the first flexible portion 25 is supported in a cantilevered structure relative to the main body 24 with the one end 25a as a fixed end and the other end 25b as a free end. Therefore, the elastic reaction force of the first flexible portion 25 becomes less corresponding to this cantilevered structure.

When the sliding portion 23 (the rain channel 21) has been assembled to the guide rail 11, the second flexible portion 26 is in pressure-contact with the third internal surface 11c. Here, the second flexible portion 26 serves for example for the purpose of stabilizing a lateral directional posture of the sliding portion 23 (the rain channel 21) being slidably moved.

Described below is an operation of the rain channel 21 in association with the operation of the panel 12 (the bracket 17). When the panel 12 is at the fully closed state, the sliding portion 23 (the main body 24) exhibits a posture approximately symmetric in the vehicle longitudinal direction, as is apparent from FIG. 2. In such circumstances, once the panel 12 is inclined with its rear end being lifted up in response to the frontward sliding movement of the slide shoe 16, as illustrated in FIG. 1B, the rain channel 21 connected to the bracket 17 changes its posture in conjunction with the operation of the panel 12. More specifically, while the rain channel 21 is slidably moving on the guide rail 11 via the sliding portion 23, the rain channel 21 turns with the shaft 22 describing an arc with a pivot on the sliding portion 23. Here, as can be seen from FIG. 2B, the sliding portion 23 (the main body 24) exhibits a nonsymmetrical posture in the vehicle longitudinal direction with a center of mass shifted rearward.

On the other hand, in a condition where the panel 23 is at the fully closed state, once the panel 12 is inclined with its rear end being lifted down in response to the rearward sliding movement of the slide shoe 16, as illustrated in FIG. 1C, the rain channel 21 connected to the bracket 17 changes its posture in conjunction with the operation of the panel 12. More specifically, while the rain channel 21 is slidably moving on the guide rail 11 via the sliding portion 23, the rain channel 21 turns with the shaft 22 describing an arc with a pivot on the sliding portion 23. Here, as illustrated in FIG. 2C, the sliding portion 23 (the main body 24) exhibits a nonsymmetrical posture in the vehicle longitudinal direction with a center of mass shifted rearward.

According to the embodiment of the present invention, comparing height-directional deformation amounts of the first flexible portion 25 among those at the fully closed state (FIG. 2A), at the tilted-up state (FIG. 2B) and at the tilted-down state (FIG. 2C), the deformation volumes of the first flexible portion 25 in FIGS. 2B and 2C are designed to be greater than the deformation volume of the first flexible portion 25 in FIG. 2A. As a result, an elastic reaction force of the first flexible portion 25 in the height direction is increased by a predetermined deformation volume, and the rain channel 21 (the sliding portion 23), which exhibits an instable posture in association with an inclination of the panel 12, can be supported by the guide rail 11 in a more stable manner.

As described above, the following effects can be obtained according to the embodiment of the present invention.

(1) According to the embodiment of the present invention, the one end 25a of the first flexible portion 25 is fixedly mounted on the main body 24. When the first flexible portion 25 is assembled to the guide rail 11, the first flexible portion 25 comes in pressure-contact with the second internal surface 11b of the guide rail 11 so that the other end 25b comes in contact with the main body 24. Therefore, when the rain channel 21 (the sliding portion 23) slides on the guide rail 11, the sliding portion 23 is substantially supported in a doubly supported structure by the main body 24. This doubly supported structure can create an increased elastic reaction force of the first flexible portion 25, thereby restraining occurrences of looseness or abnormal noises due to a vehicle vibration. Moreover or alternatively, this structure can lead to a longer endurance life of the first flexible portion 25 corresponding to the increased amount of the elastic reaction force thereof.

Further, even if a vehicle vibration occurs, the other end 25b, which is not actually fixed to the main body 24 and serves as a free end of the first flexible portion 25, can slip at a contact portion with the main body 24. This slipping of the other end 25b can effectively absorb the vehicle vibration transmitted to the sliding portion 23. Therefore, it is possible to prevent the one end 25a, which is a connected portion with the main body 24 and serves as a fixed end of the first flexible portion 25, from being damaged.

Meanwhile, when the rain channel 21 (the sliding portion 23) is mounted on the guide rail 11, the other end 25b completely comes in contact with the main body 24. This is accompanied by the compression of the first flexible portion 25 coming in pressure-contact with the second internal surface 11b. In other words, when the rain channel 21 has not been mounted on the guide rail 1, i.e., when the rain channel 21 remains alone without contact, the contact between the other end 25b of the first flexible portion 25 and the main body 24 has not been completed, and the clearance C is defined therebetween. Therefore, prior to being assembled to the guide rail 11, the first flexible portion 25 is supported by a cantilevered structure with the one end 25a supported by the main body 24. This cantilevered structure can result in a reduction of an elastic reaction force of the first flexible portion 25, which can assure a good assembling performance of the sliding portion 23 to the guide rail 11.

Furthermore, when the rain channel 21 has not been mounted on the guide rail 11, i.e., when the rain channel 21 remains alone without contact, the clearance C is defined between the other end 25b of the first flexible portion 25 and the main body 24. Therefore, when the sliding portion 23 needs to be die-cut from a mold, it is possible to assure a good moldability of the sliding portion 23.

(2) According to the embodiment of the present invention, the height-directional deformation volume of the first flexible portion 25 during the panel 12 being inclined is 25 designed to be greater than that of the first flexible portion 25 at the fully closed state. As a result, an elastic reaction force of the first flexible portion 25 in the height direction is increased by a predetermined deformation volume, and the rain channel 21, which exhibits an instable posture in association with an inclination of the panel 12, i.e., the sliding portion 23, which exhibits a nonsymmetrical posture in the vehicle longitudinal direction, can be supported by the guide rail 11 in good manner by virtue of the increased elastic reaction force. Therefore, even when the rain channel 21 exhibits an unstable posture on the guide rail 11, it is possible to preclude or restrain an occurrence of a looseness or abnormal noise due to a vehicle vibration.

(3) According to the embodiment of the present invention, the second flexible portion 26 comes in pressure-contact with the internal surface 11c, and will enable a posture of the rain channel 21 (the sliding portion 23) to be stabilized in a vehicle lateral direction.

The above-described embodiment of the present invention can be modified as follows.

The above-described shape of the sliding portion 23 serves as an example. The main body 24 of the sliding portion 23 can be molded with an outer surface in an arc shape in such a manner that the longitudinal intermediate portion of the main body 24 projects downwardly.

The above-described shape of the guide rail 11 serves as an example. The guide rail 11 is not limited to possess an approximately reverse C shaped cross section as far as the guide rail 11 includes at least two walls which face each other in a vehicle height direction.

Next, described below is a technical concept obtained from the above-described embodiment and modification.

(A) In a sunroof apparatus including a sliding member, which is provided at a panel opening and closing an opening portion defined at a roof portion of a vehicle, is freely slidably supported by a guide rail, and is configured to slide on the guide rail so as to open and close the panel, the guide rail includes a first internal wall surface and a second internal wall surface, which both face each other in a height direction. The sliding member includes: a main body portion which is supported by the first internal wall surface; and a first flexible portion. One end of the first flexible portion is connected to the main body portion. The other end of the first flexible portion is configured to come in pressure-contact with the main body portion when the first flexible portion comes in pressure-contact with the second internal wall surface.

(B) The guide rail further includes a third internal wall surface, which connects the first and second internal wall surfaces in the height direction. The sliding member can further include a second flexible portion that is configured to come in pressure-contact with the third internal wall surface. According to this technical concept, the sliding member can be stabilized in a vehicle lateral direction at a time of slidable movement on the guide rail, because the second flexible portion is in pressure-contact with the third internal wall surface.

As described above, the first flexible portion of the sliding member exhibits a substantially doubly supported structure when it slides on the guide rail, with the one end being connected to the main body portion, and with the other end configured to come in contact with, and to be supported by, the main body portion when the first flexible portion is in pressure-contact with the second internal wall surface. In this case, an elastic reaction force of the first flexible portion is increased, which restrains an occurrence of an abnormal noise or looseness due to a vehicle vibration. Further, when the other end of the first flexible portion comes in contact with, and is supported by, the main body portion, the other end slips on the main body portion. Therefore, when a remarkably large vehicle vibration occurs, its vibration can be absorbed.

On the other hand, upon assembling the sliding member onto the guide rail, the contact between the other end and the main body portion is completed in response to completion of the pressure-contact of the first flexible portion to the second internal wall surface. In other words, when the sliding member has not been mounted on the guide rail, i.e., when the sliding member remains alone as a single body prior to being assembled to the guide rail, a clearance is defined between the other end and the main body portion because the other end has not come in completely contact with the main body portion. Therefore, the sliding member is supported in a cantilevered structure by the main body portion so that its elastic reaction force is reduced. In this case, it is possible to assure a good assembling performance of the sliding member.

A deformation amount of the first flexible portion in the height direction when the panel is inclined relative to a fully closed state is set to be greater than a deformation amount thereof in the height direction at a time of the fully closed state of the panel. Therefore, although the sliding member exhibits an unstable posture in response to the inclination of the panel, an elastic reaction force of the first flexible portion in the height direction is increased by a set amount corresponding to the deformation, and the sliding member is reliably supported by the guide rail. Therefore, even when the sliding member is supported in an unstable posture, it is possible to preclude or restrain an occurrence of a looseness or abnormal noise due to a vehicle vibration.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A sunroof apparatus for a vehicle comprising:
    a roof portion of the vehicle;
    a panel for opening and closing an opening portion defined at the roof portion;
    a guide rail configured to move the panel for opening and closing the opening portion;
    a sliding member, one end of which is freely rotatably connected to the panel, and an other end of which is freely slidably supported by the guide rail, wherein the sliding member is configured to slidably move and incline at the guide rail in association with an inclination of the panel, and the sliding member is configured to slidably move at the guide rail in association with the movement of the panel;
    a first internal wall surface with which the guide rail is provided;
    a second internal wall surface with which the guide rail is provided and which faces the first internal wall surface in a height direction;
    a main body portion which the sliding member includes and which is supported by the first internal wall surface; and
    a first flexible portion which the sliding member includes, one end of the first flexible portion being connected to the main body portion and an other end of the first flexible portion being configured to come in pressure-contact with the main body portion when the first flexible portion comes in pressure-contact with the second internal wall surface.

2. A sunroof apparatus according to claim 1, wherein the sliding member is positioned behind the panel in the longitudinal direction of the vehicle.

3. A sunroof apparatus according to claim 1, wherein the sliding member is a rain channel positioned below the panel in the height direction of the vehicle.

4. A sunroof apparatus according to claim 3, wherein the sliding member extends in a lateral direction of the vehicle.

5. A sunroof apparatus according to claim 1, wherein the sliding member is a rain channel positioned at a rear end of the panel in a longitudinal direction of the vehicle and extending in a lateral direction of the vehicle.

6. A sunroof apparatus according to claim 5, wherein the sliding member is linked to the rear end of the panel via an opening and closing mechanism.

7. A sunroof apparatus according to claim 1, wherein a deformation amount of the first flexible portion in the height direction when the panel is inclined relative to a fully closed state is set to be greater than a deformation amount thereof in the height direction at a time of the fully closed state of the panel.

8. A sunroof apparatus according to claim 1, wherein the main body portion includes a longitudinally intermediate portion projecting downwardly in the height direction of the vehicle, and the first flexible portion includes a longitudinally intermediate portion projecting upwardly in the height direction of the vehicle.

9. A sunroof apparatus according to claim 1, further comprising:
- a third internal wall surface connecting between the first internal wall surface and the second internal wall surface; and
- a second flexible portion configured to come in pressure-contact with the third internal wall surface.

* * * * *